July 12, 1955 D. BEGGS 2,712,981
GAS GENERATOR AND PROCESS FOR PRODUCING DRY GAS
Filed Feb. 24, 1953
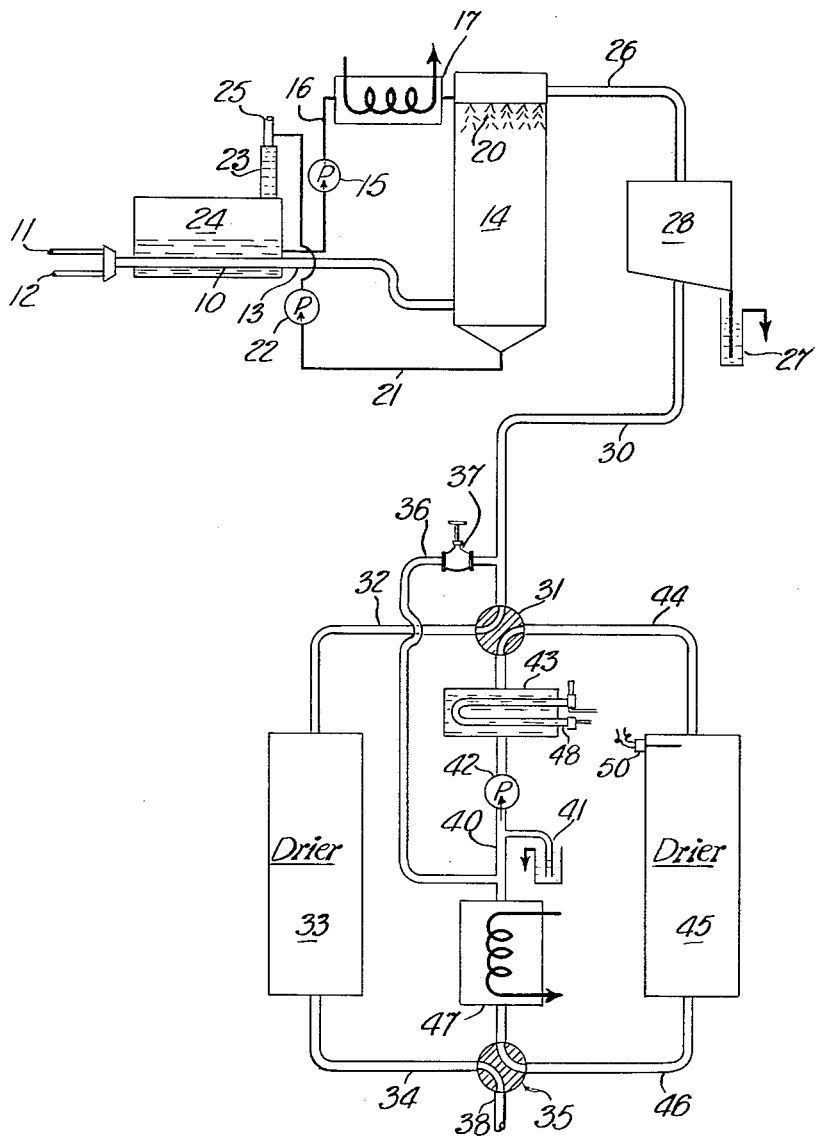
INVENTOR
*Donald Beggs*
BY
*Charles S. Haughey*
Agt.

United States Patent Office 2,712,981
Patented July 12, 1955

2,712,981
GAS GENERATOR AND PROCESS FOR PRODUCING DRY GAS

Donald Beggs, Toledo, Ohio, assignor to Surface Combustion Corporation, Toledo, Ohio, a corporation of Ohio Application February 24, 1953, Serial No. 338,310

1 Claim. (Cl. 23—150)

This invention relates to dried gas generators, and more particularly to drying inert gases used for protective atmosphere in the annealing of steel and for many other purposes.

When such gases are produced by combustion, they generally have a very high dew point, or moisture content. Most of the moisture is customarily removed by condensation on water cooling coils to dew points of about 90° F. or by condensation on refrigeration coils to dew points of about 40° F. If gas is desired having dew points below about 40° F., it is customary to pass the gas through alternately used chambers of desiccant material such as the well known alumina.

The desiccant chambers are generally sized to operate effectively at maximum gas generator capacity for about 8 hours on stream so that a previously used desiccant chamber may be regenerated during the run. A typical regeneration time cycle is about three hours heating to regenerate the desiccant, followed by about five hours of cooling to return the reactivated desiccant to active operating temperatures.

It is preferred to heat the desiccant for regeneration by recirculation of hot gas therethrough. If the recirculating gas is hot enough the adsorbed moisture will be driven off the desiccant even though steam is recirculated. Where inert gas containing low amounts of carbon-dioxide is produced by absorption of the carbon-dioxide from gaseous products of combustion by monoethanolamine or equivalent solutions such as are well known for the purpose, some carry over of the absorbent solution is likely, and in the case of monoethanolamine it will deposit a tarry substance on the desiccant which must be removed during the regeneration cycle. It has been found that the tarry substance can be effectively removed by heating the desiccant to about 350° F. and circulating a gas therethrough to carry off the vapors though 212° F. would be high enough to remove just water. Since activated alumina is damaged and made less active by heating to over about 600° F., a reasonable range of safe operating temperatures during reactivation between 350° F. and 600° F. must be maintained for at least a short time when the desiccant is activated alumina. A range of 450° F. to 500° F. is preferred for alumina, and is generally obtained by controlling the alumina regeneration to heat the inlet end of the tower to about 500° F., and the outlet end temperature of the tower will be brought to over 350° F., and of course will not exceed the inlet end temperature of 500° F.

Before the reactivated alumina can be put back on the line as an active and operating desiccant, it must be purged of any gas foreign to the final gas produced by the gas generator as a whole. Since product gas is available, it is obviously possible to utilize final product gas for this purpose. This requires the desiccant which is on stream to treat an extra amount of gas to provide a flow of purge gas. Depending on design and conditions this may mean a flow through the on stream desiccant of 5 to 25% in excess of the final product gas stream, hence the desiccant chambers must be correspondingly larger. This invention provides for reactivation of such desiccants, without requiring desiccant capacity in excess of that necessary to deliver the rated quantity of product dry gas.

For a consideration of what I believe to be novel and my invention, attention is directed to the following portion of the specification and the drawing and concluding claim thereof.

The drawing is a flow diagram of a gas generator illustrating the present invention.

According to this invention as illustrated, a gas generator providing a continuous flow of dry gas from a wet gas produced by combustion of fuel may comprise a $CO_2$ removal step, utilizing a $CO_2$ absorbing solution such as a water solution of monoethanolamine, hereinafter referred to as m. e. a. The wet $CO_2$ depleted gas, somewhat contaminated with m. e. a., is passed through a refrigeration step wherein most of the m. e. a. contaminant and most of the contained moisture are condensed and removed, the amount of moisture removal generally corresponding to a dew point reduction of from about 90° F. to 40° F.

While a first desiccant chamber is on the line, a second is being regenerated by recirculating therethrough a stream of gas heated to the degree required to attain from about 350° to 600° F. in the second chamber, preferably about 500° F. at the control point near the recirculating gas inlet. A constant bleed of purge gas into the recirculating stream is used to displace the moisture and tarry m. e. a. deposit vaporized from the desiccant. To avoid the necessity of an additional purge cycle to remove impurities after cooling of the desiccant, a small stream of desiccant chamber inlet gas is bled into the recirculating stream, and a portion of the recirculating stream is vented.

Referring more particularly to the drawing, the gas generator illustrated comprises a combustion chamber in the form of an immersion heating tube 10 wherein fuel from conduit 11 and air from conduit 12 are burned. The preferred fuel is natural gas, though many fuels will serve adequately. The wet combustion gas passes through conduit 13 into a $CO_2$ absorption tower 14 wherein a $CO_2$ absorbent such as a water solution of monoethanolamine, or m. e. a., is circulated. The m. e. a. is delivered to the $CO_2$ absorber tower 14 by pump 15 through conduit 16 and water cooled heat-exchanger 17 to sprays 20. The m. e. a. (which has absorbed $CO_2$) is then circulated from the bottom of the tower 14 through conduit 21, by pump 22, to the top of a condenser 23 and therethrough into a regenerator 24 wherein it is heated by the combustion of fuel and air in tube 10. $CO_2$ is driven off from the solution with a proportion of steam, and passes through the condenser 23 to a vent 25. The steam is condensed by the incoming m. e. a. and returned to the solution.

The wet, $CO_2$ free gas leaves the tower 14 at about 90° F. through conduit 26 and passes through a refrigerator 28 which cools the gas to 40° F. and condenses the major portion of moisture and m. e. a. carry over, passing the condensate through a liquid seal 27 to the sewer. The 40° F. dew point gas passes then through conduit 30 to a desiccant drier system, the major portion passing through a four-way valve 31 and conduit 32 to a first, active alumina tower 33, and thence through conduit 34, four-way valve 35 and pipe 38 to use. A small portion of the 40° F. dew point gas stream passes through conduit 36 and valve 37 and enters a recirculating gas stream in conduit 40. A small portion of the recirculating gas stream, substantially equal to the stream entering by conduit 36, is vented through a water seal 41 at the inlet to a recirculating pump 42, thus assuring a minimum pressure in the recirculating system equal to that required to cause the discharge of gas through the water seal 41, preferably about 6 inches of water column. The stream of gas passes through pump 42, through an indirect heater 43, which is heated by a fuel fired radiant tube 43, through valve 31 and a conduit 44 and into a second alumina tower 45, and thence through a conduit 46 and four-way-valve 35, through a water cooled cooler 47, and on to the pump 42. During the heating portion of the alumina regeneration cycle, the heater is operated under the control of thermocouple 50 to maintain a temperature at the thermocouple of about 500° F. until the gas entering pipe 46 reaches about 350° F., indicating that the entire bed of desiccant has been reactivated. This reactivation can be accomplished in about 3 hours. The heater 43 is then turned off and the desiccant is cooled by passing the recirculating gas stream through cooler 47 until the entire bed is at a temperature of say 100° F. or less, depending on the temperature of the water supplied to cooler 47. This cooling can be accomplished in about 4 to 5 hours.

The small portion of 40° F. dew point gas that is admitted to the recirculating gas stream through conduit 36 serves to exclude foreign gases or air from the desiccant during reactivation and cooling so that when the tower is put into adsorbing service there is no chance of contamination of the gas being dried. This small flow of 40° F. dew point gas adds water or m. e. a. contaminant to the desiccant being reactivated and cooled only for a short period at the end of the cooling period, say the last 1 hour, during which the desiccant is cool enough to adsorb water. Any water vapor which enters the recirculating stream through conduit 36 during the reactivation period and the early stages of the cooling is, of course, not picked up by the desiccant but is instead vented through the water seal 41.

I claim:

The method of providing a continuous stream of dry gas from a monoethanolamine-contaminated wet gas produced by combustion of fuel and subsequent removal of carbon dioxide from the products of combustion by absorption in a monoethanolamine solution, which method comprises passing a stream of the resulting wet gas through a container of active alumina desiccant while reactivating a second container of alumina desiccant, such reactivation including the steps of recirculating a stream of gas through the second container, heating the recirculating stream entering the second container to a temperature between 350° F. and 600° F. to convert the moisture in the second container to steam, while venting the recirculating stream against a slight back pressure, then cooling the recirculating stream to cool the desiccant below 212° F., and bleeding a portion of the wet methanolamine-contaminated gas into the recirculating stream during the heating and cooling steps, whereby the recirculating stream is maintained under a slight pressure at all times, and at the end of the heating operation steam is purged from the recirculating stream, the heating operation being continued until the desiccant is reactivated by removal of moisture and tarry residue, including moisture and tarry residue picked up from the methanolamine-contaminated wet gas bled into the recirculating stream, so that the only moisture and tarry residue left in the desiccant by such wet gas is that which is left during the cooling operation.

References Cited in the file of this patent

UNITED STATES PATENTS

| | | |
|---|---|---|
| 1,948,779 | Abbott et al. | Feb. 27, 1934 |
| 2,083,732 | Moore et al. | June 15, 1937 |
| 2,487,576 | Meyers | Nov. 8, 1949 |
| 2,535,902 | Daily, Jr. | Dec. 26, 1950 |